(12) United States Patent
Siebol

(10) Patent No.: US 6,257,498 B1
(45) Date of Patent: Jul. 10, 2001

(54) METHOD AND APPARATUS FOR AN AGRICULTURAL AIR HANDLER

(76) Inventor: James R. Siebol, 4300 Birchfield Rd., Yakima, WA (US) 98901

( * ) Notice: Subject to any disclaimer, the term of this patent is extended or adjusted under 35 U.S.C. 154(b) by 0 days.

(21) Appl. No.: 08/946,325

(22) Filed: Oct. 7, 1997

(51) Int. Cl.⁷ .................................................. B05B 9/06
(52) U.S. Cl. .................... 239/77; 239/14.1; 239/129; 239/135; 239/165; 239/172; 239/78; 47/2; 416/171; 416/246; 415/122.1; 415/126; 415/213.1
(58) Field of Search .................... 239/2.2, 14.1, 239/77, 128, 129, 130, 135, 159, 160, 165, 78, 172, 654, 225.1, 263, 499; 47/2; 416/171, 246; 415/122.1, 126, 213.1

(56) References Cited

U.S. PATENT DOCUMENTS

| | | |
|---|---|---|
| 561,059 | 5/1944 | Sanderson et al. . |
| 1,363,720 * | 12/1920 | Cooper ........................................ 47/2 |
| 1,389,989 * | 9/1921 | Ross ................................. 239/14.1 X |
| 1,903,615 | 4/1933 | Towt . |
| 1,991,851 * | 2/1935 | Hammell ..................................... 47/2 |
| 2,102,989 * | 12/1937 | Bose ............................................ 47/2 |
| 2,164,011 * | 6/1939 | Hilborn ....................................... 47/2 |
| 2,184,109 * | 12/1939 | Ames .......................................... 47/2 |
| 2,668,082 * | 2/1954 | Pasteur .............................. 239/129 X |
| 2,800,746 * | 7/1957 | Harmon ...................................... 47/2 |
| 2,836,932 | 6/1958 | Potter .......................................... 47/2 |
| 2,886,249 * | 12/1959 | Sidlow ..................................... 239/77 |
| 2,925,222 | 2/1960 | Spreng ................................... 239/172 |
| 3,296,739 | 1/1967 | Wiegel ........................................ 47/2 |
| 3,655,130 * | 4/1972 | Patrick ..................................... 239/77 |
| 4,513,529 | 4/1985 | Reich ......................................... 47/2 |
| 5,082,177 | 1/1992 | Hill et al. ............................... 239/77 |
| 5,172,861 * | 12/1992 | Lenhardt ................................ 239/78 |
| 5,305,548 | 4/1994 | Siebol ........................................ 47/2 |
| 5,586,725 | 12/1996 | Ballu ..................................... 239/172 |

* cited by examiner

Primary Examiner—David A. Scherbel
Assistant Examiner—Steven J. Ganey

(57) ABSTRACT

An economical and compact air handler specially configured for use in agricultural applications is provided. The agricultural air handler includes a shroud formed to surround a rotating shaft having a propeller attached to each end of the shaft. The propellers draw air through an air inlet located proximate the top of the shroud. Each propeller blows the air out of an end of the shroud. A shaft drive rotates the shaft. The shaft drive can be powered by a source outside the shroud, or a source contained within the shroud. The power source can include a hydraulic pump driven by the power take-off of a tractor. An air stream is blown from the shroud. The air stream is directed in an approximately vertically planar flow pattern to remove water ponded within the stem cup of a agricultural crop, such as cherries. The air handler can be used as a freeze protecting heat exchanger or for the application of liquid or dust formulations of agri-chemicals. The agricultural air handling device can also be utilized for atmosphere modification of an enclosed area containing a crop or orchard.

3 Claims, 13 Drawing Sheets ical air handler, and more particularly to an air handler especially suited for drying, spraying and freeze protecting a variety of agricultural crops, especially those produced in orchards or trellises and on trees, bushes or vines.

METHOD AND APPARATUS FOR AN AGRICULTURAL AIR HANDLER

TECHNICAL FIELD

The invention relates to a method and apparatus for an agricultural air handler, and more particularly to an air handler especially suited for drying, spraying and freeze protecting a variety of agricultural crops, especially those produced in orchards or trellises and on trees, bushes or vines.

BACKGROUND OF THE INVENTION

Rain can pose a severe threat to a mature and ripening cherry. The ripening cherry acts like a sponge and will quickly absorb water that pools in its stem cup, the natural depression formed in the top of the cherry at the base of its stem. Because the cherry's skin is unable to accommodate the swelling that accompanies the water absorption, an unappealing split occurs in the outer flesh and skin of the fruit. This splitting is not only unsightly, it is also a breeding site for molds and bacteria. A crop of cherries with excessive splitting is of little value to an orchardist.

Cherries ripen in the very early summer. Rains are a typical occurrence for this time of year in cherry growing regions, worldwide. If several rains occur in the period prior to harvest, but while the cherries are susceptible to splitting, the costs incurred by orchardists to adequately helicopter dry their orchard can quickly eat up any anticipated profit.

Currently, there are few options for the removal of rain water from cherries. Several strategies have developed to prevent the rain induced splitting of cherries. The most effective strategies currently employed rely on preventing the rain from first contacting the cherry. A rain diffusing or repelling covering over each cherry tree or portion of an orchard is a sure but very expensive solution. The costs incurred in the purchase, installation and maintenance of covering far outweighs the potential benefits for most orchards.

After a soaking rain, many cherry growers without coverings rely upon conventional helicopters to literally shake the rain off the cherries. The extraordinary downdraft induced by the helicopter's beating rotors quickly disperses the water that ponds in the cherry's stem cup, and so halts the absorption of the ponded water into the cherry.

Several problems exist with the use of helicopters for this purpose. A primary problem is that helicopters are expensive and somewhat dangerous to operate. Additionally, if an orchard is on a hill or has overhead obstructions like power lines, wind breaking trees or light poles, the helicopter's use is especailly limited. Such obstruction can render entire areas of the orchard inaccessible, thereby allowing large portions of the cherry crop to split.

Also, even with vigorous helicopter drying, each cycle of rain and splitting will damage a significant portion of the crop. Helicopters are far form being totally effective. A portion of the cherries will be shielded or missed by the helicopter at each pass. Helicopters are also far from gentle on cherries. The ripening cherries are very susceptible to bruising. The beating helicopter blades can inflict as much damage as they are attempting to prevent. Helicopters are too powerful and vigorous to dry cherries without inflicting significant damage to the fruit in their efforts.

Another problem with helicopters is that in the event of widespread rains, they cannot be everywhere they are needed. Their overall number available for orchard drying are typically quite limited in any particular cherry growing area. Smaller orchards are always further down the waiting list from larger orchards that are able to pay much higher fees for the drying service. By the time the smaller orchard, or even the last serviced area of the larger orchard, is treated by the helicopter, the rain's damage to the cherries is already done.

For smaller orchards, a conventional orchard spray rig is often relied upon for some measure of reducing rain damage. The orchard spray rig typically includes a powerful blower pulled behind a tractor. The blower, as it rides close to ground level, forces air up into the trees. For spraying, a row of atomizers around the blower can deliver pesticides and other farm chemicals.

However, the uilization of the conventional spray rig for drying cherries has problems. The spray rig is typically too gentle and has little effect on dispersing rain water from the stem cups. From below the trees, the spray rig's blowers are unable effectively reach the ponded water in the stem cup at the top of each cherry. Additionally, the spray rig's blowers are designed to broadcast material, delivering a diffuse air flow instead of the concentrated blast of air required to dislodge the ponded water.

U.S. Pat. No. 5,586,725 to Ballu discloses an agricultural chemical blower having linear blowing panels. However, the Ballu '725 device requires compressed air to operate. Such a device fails to deliver the volumes of air required to be utilized for drying a crop.

It is little wonder that many orchardists, especially smaller, family owned operations, give up on rain damage prevention, leaving their profits to the whims nature. A cherry drying device is needed that is gentle on the rain soaked cherry, but effectively removes ponded water from the stem cup.

Other crops, especially those that are grown to a height, lack an efficient and cost effective means to reduce the damage caused by rain and moisture. Weather patterns can change from global climatic factors like "El Niño." Growers need the ability to help their crops through cyclical changes in weather. A device is needed that will allow a farmer or orchardist to dry a crop whenever moisture or rain needs to be removed from the crop.

In addition to rains, freezing temperatures can devastate a crop in a matter of hours. Many devices that rely upon circulating the inversion layer of warmer air down to the level of the crop are known. One such device is the orchard heat exchanger invented by the present inventor, James Siebol. In his issued U.S. Pat. No. 5,305,548, Siebol disclosed a dual propeller fan system. The Siebol '548 apparatus is inherently large, due to the required internal combustion engine enclosed with in the shroud of the device. Additionally, the Siebol '548 device only mentions cherry drying and spray applications in the brief description of the invention in passing. A need exists for an improved dual propeller fan system with the basic configuration of the Siebol '548 device, but more economical to build and having broader applications in the farm or orchard. A related need exists for an agricultural air handler that details a specific apparatus and method for agricultural spraying and crop drying.

Another problem with internal combustion engine located at the top of an extending "lift" is that the vibrations from the engine require a more sturdy construction (and support) than if such an engine were not present. Additionally, the size of an internal combustion engine requires the shroud to be large and bulky. The shroud must also be easily accessible to aid in the frequent maintenance that an internal combustion engine inherently requires. A device is needed that can provide efficient and effective heat exchange at a reasonable expense for the small orchardist or grower.

SUMMARY OF INVENTION

The invention provides a method and apparatus for an air handler specially configured for use in agricultural applications. The agricultural air handler apparatus of the present invention includes a shroud formed to surround a rotating shaft. The shroud has a top surface, a bottom platform and two opposing ends. Two propellers are also included. One propeller mounts proximate to each end of the shaft. The propellers draw air through an air inlet located proximate the top of the shroud. Each propeller blows the air out of an end of the shroud.

A shaft drive rotates the shaft. The shaft drive can be powered by a source outside the shroud, or a source contained within the shroud. The power source can include a hydraulic pump driven by the power take-off of a tractor.

The agricultural air handler apparatus can mount to a tractor. The tractor is of conventional design and has an exhaust pipe. Also alternatively, a tubular exhaust line can connect to the exhaust pipe of the tractor. The exhaust line is routed proximate the air inlet of the shroud for feeding an engine exhaust from the tractor into the air inlet of the shroud. Additionally, a liquid line can supply water to the air inlet of the shroud.

The method of the invention includes an initial step of forming a shroud to surround a shaft and to surround a shaft drive. The shaft drive includes a powered motor for rotating the shaft. The shroud includes a first diffuser, a second diffuser, and an air inlet proximate the top of the shroud. The shaft includes a first shaft end and a second shaft end. A first propeller is mounted proximate the first shaft end and a second propeller is mounted proximate the second shaft end. The shaft is rotated with a shaft drive and an air stream is blown from the first diffuser by the first propeller and an air stream is blown from the second diffuser by the second propeller. The air stream is directed out of the first diffuser and the second diffuser, in an approximately vertically planar flow pattern to remove water ponded within the stem cup of a agricultural crop, such as cherries.

According to one advantage of the invention, an agricultural air handling device is provide that is gentle on the rain soaked cherry, but effectively removes ponded water from the stem cup.

According to a related advantage of the invention, an agricultural air handling device that can deliver the large volume of air required to be utilized for drying a crop.

According to another related advantage of the invention, an agricultural air handling device is provided that is economical and compact, yet can service a large area, thereby allowing a farmer or orchardist to dry a crop whenever moisture or rain needs to be removed from the crop.

According to another advantage of the invention, an agricultural air handling device is provided that can also be utilized as a freeze protecting heat exchanger.

According to yet another advantage of the invention, an agricultural air handling device is provided that can also be utilized as a liquid agricultural chemical sprayer.

According to still another advantage of the invention, an agricultural air handling device is provided that can also be utilized as a liquid agricultural chemical sprayer.

According to again another advantage of the invention, an agricultural air handling device is provided that can also be utilized as a powdered formulation agricultural chemical spreader.

According to another advantage of the invention, an agricultural air handling device is provided that can also be utilized for atmosphere modification within an enclosed area that contains a crop or orchard.

DETAILED DESCRIPTION OF SPECIFIC EMBODIMENTS

Figure 1:
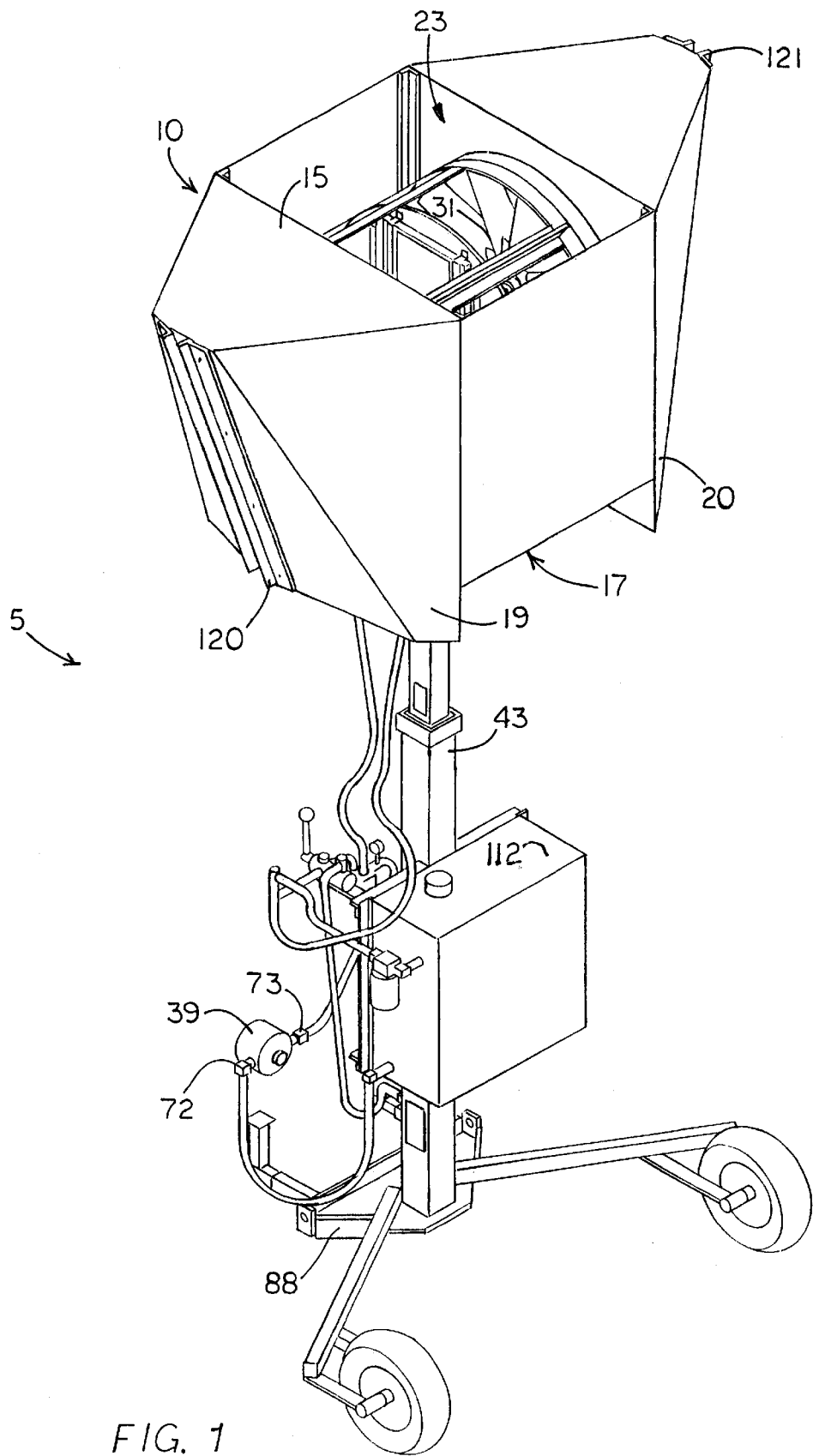
FIG. 1 is a perspective diagram of an agricultural air handler, according to an embodiment of this invention.

The invention provides a method and apparatus for an agricultural air handler. Preferred embodiments of the present invention are shown in FIGS. 1 through 15. FIG. 1 depicts the agricultural air handler 5 in a preferred configuration that is suited for the drying or removal of rain water from tree crops, especially cherries.

Figure 3:
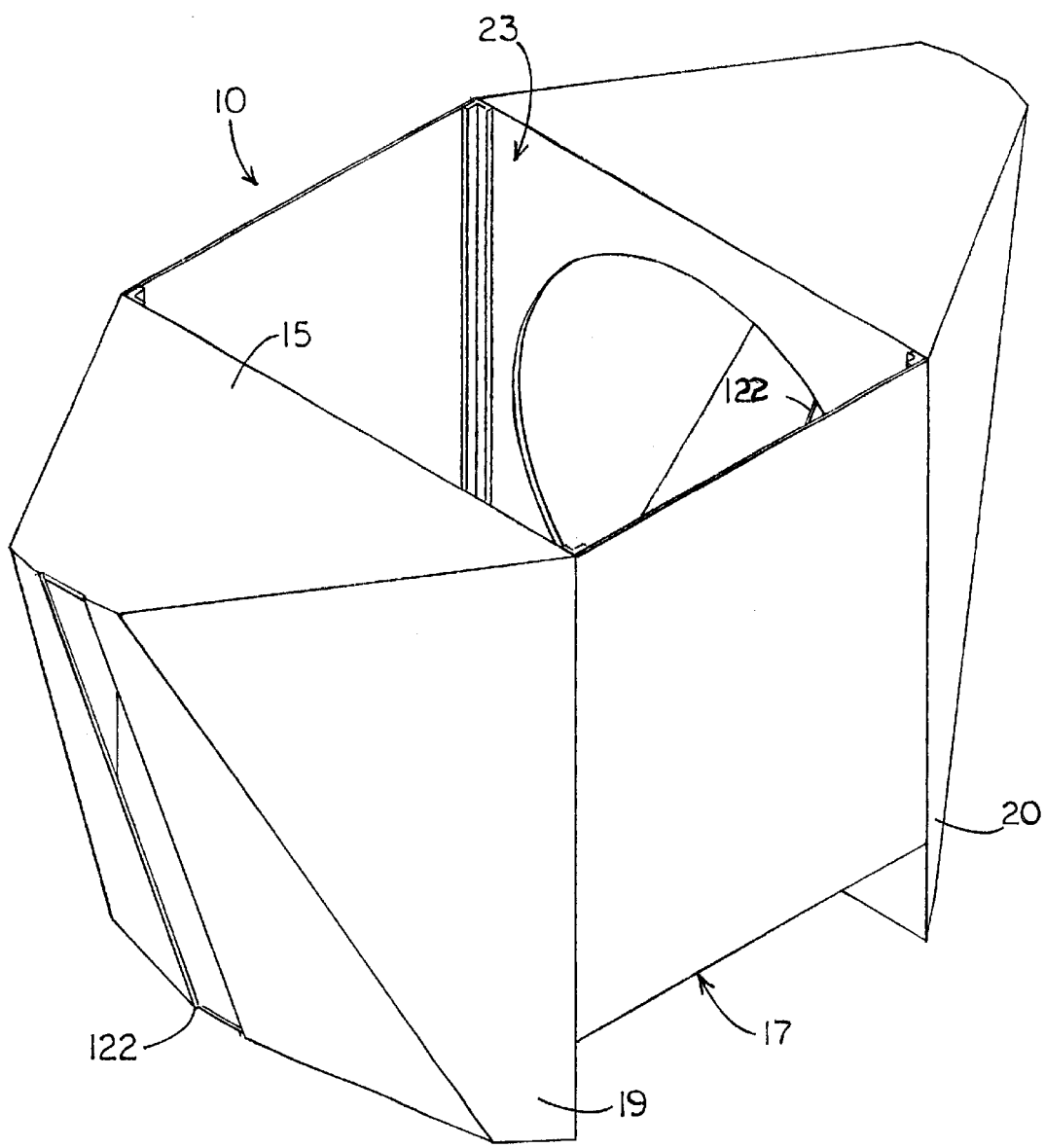
FIG. 3 is a partial perspective diagram of an agricultural air handler, according to an embodiment of this invention.

The shroud 10 of the air handler 5, as shown in FIG. 1 and detailed in FIG. 3, is preferably fabricated from galvanized sheet metal of a standard gauge of approximately 18, such that the shroud exhibits a minimum of vibration when the air handler is in use. The shroud includes a top 15, a bottom 17, a first end 19 and a second end 20, and an air inlet 23. The air inlet is located proximate the top of the shroud. The location of the air inlet at the top of the shroud allows the air handler to draw air from above the shroud and to minimize the circulation of air back into the air inlet after the air is expelled from the shroud.

Figure 4:
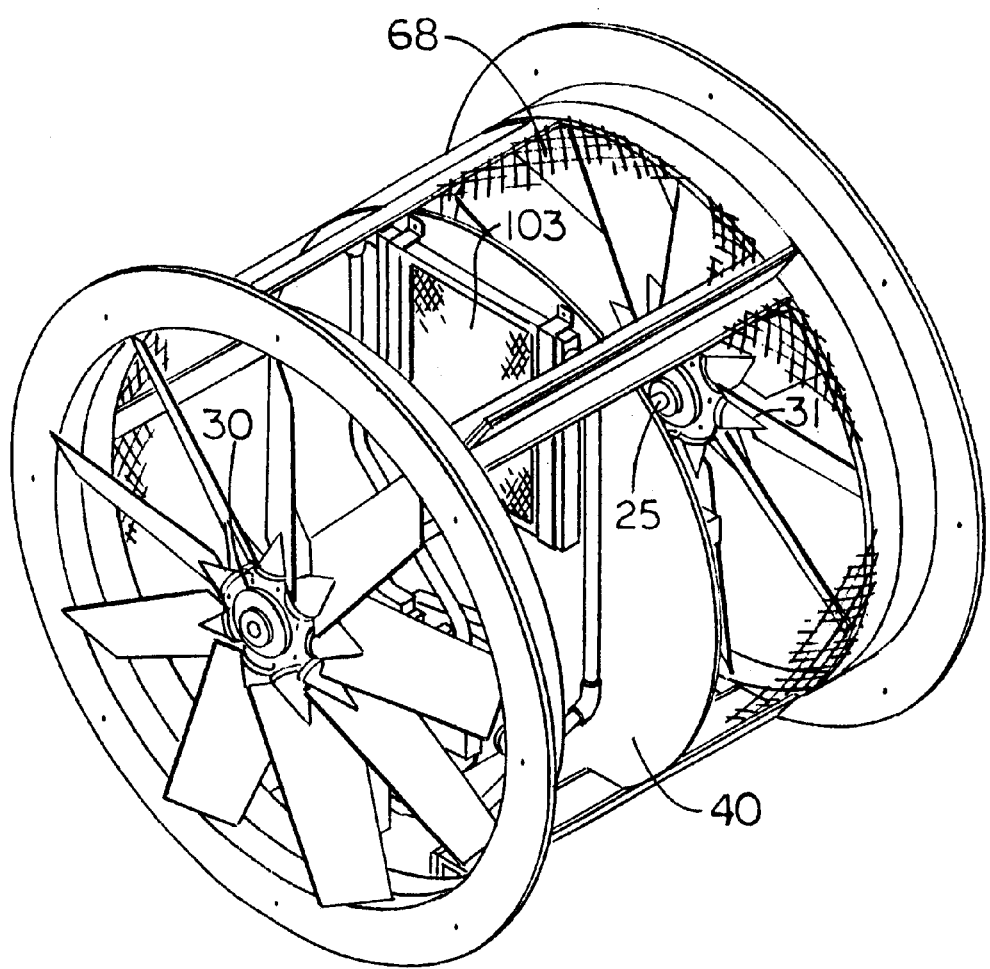
FIG. 4 is a partial perspective diagram of an agricultural air handler, according to an embodiment of this invention.
Figure 5:
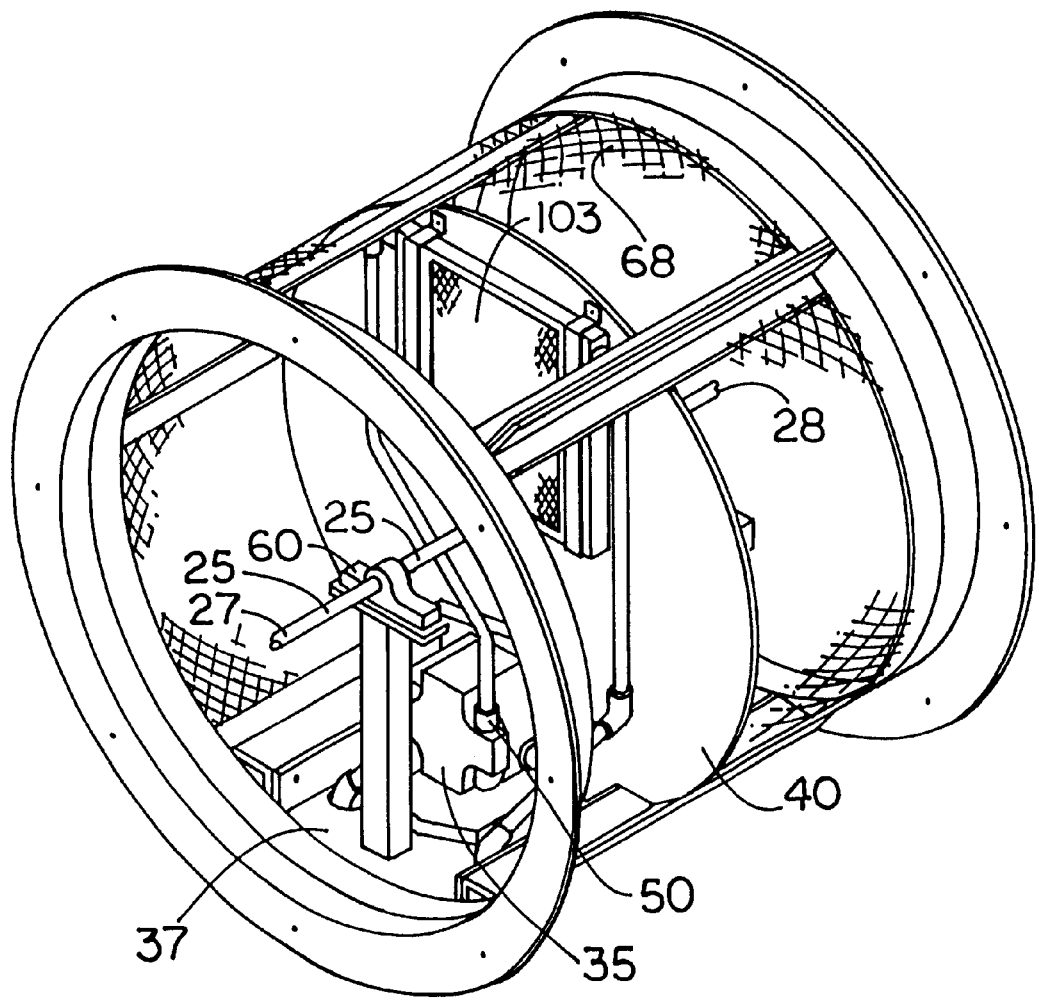
FIG. 5 is a perspective diagram of an agricultural air handler, according to an embodiment of this invention.
Figure 6:
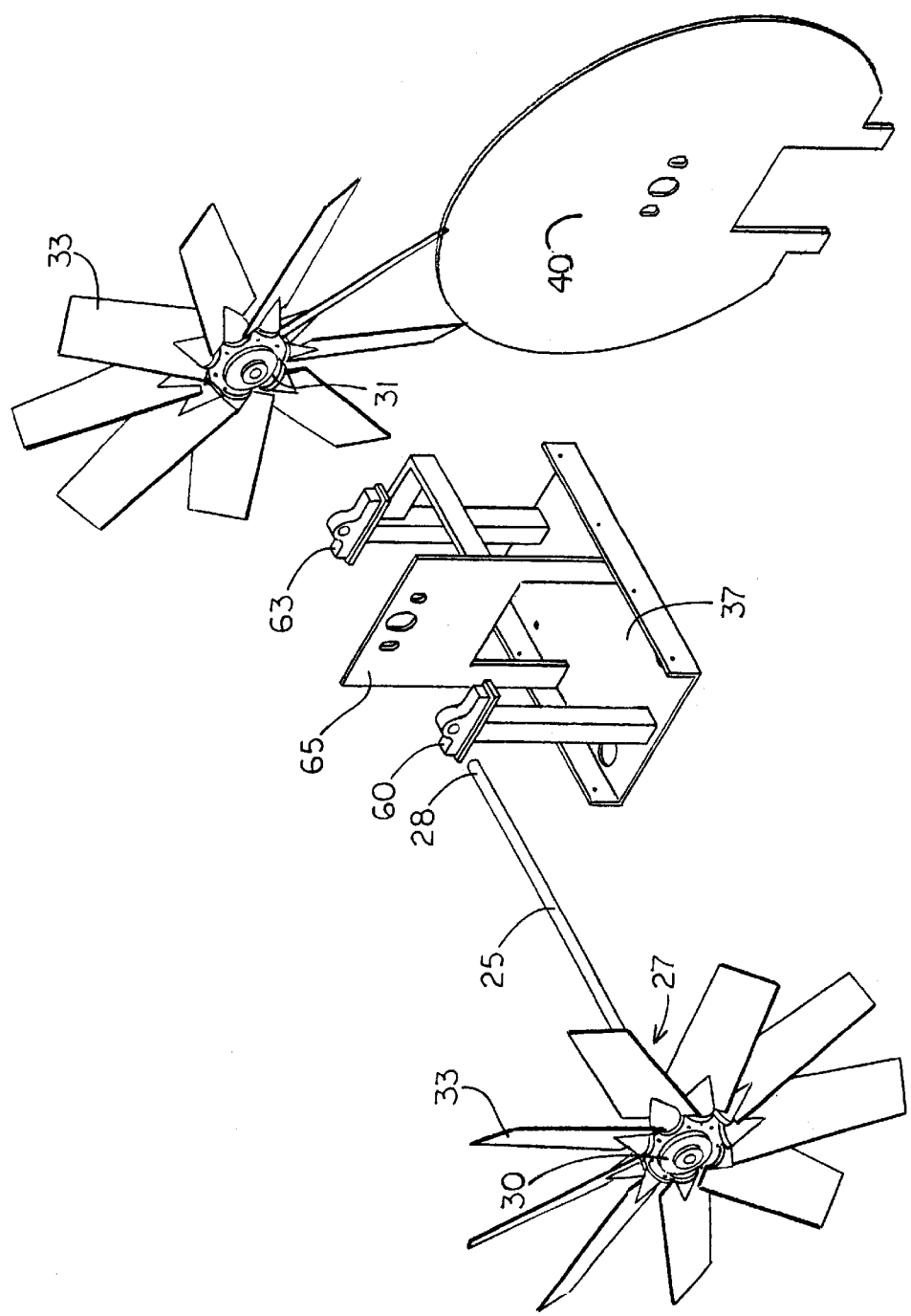
FIG. 6 is a partial exploded perspective diagram of an agricultural air handler, according to an embodiment of this invention.

As shown in FIGS. 2, 4, 5, 6, 9 and 10, the shroud 10 is formed to surround a shaft 25 and inter-related structures as discussed hereinafter. As detailed in FIGS. 5 and 6, the shaft is of conventional design with a first shaft end 27 and a second shaft end 28. The shaft is preferably fabricated from a cold rolled steel having a diameter sufficient to prevent bending or deformation under extended use at a level of torque normally encountered for moderate duty industrial fans. A first propeller 30 is mounted near the first shaft end which is also near to the first end 19 of the shroud. A second propeller 31 is mounted proximate the second shaft end, which is near the second end 20 of the shroud. The first and second propellers are shown in FIG. 6 as propellers that include nine blades 33. Preferably, each blade has an individually adjustable pitch. The adjustment of the blade pitch allows a user to adjust the air moving characteristics of the propeller. Adjusting the blade pitch allows the user to operate the air handler at various propeller rotational speeds while also allowing a wide range of brake horsepower supplied to the propellers to achieve a desired air flow through the air handler 5.

Figure 9:
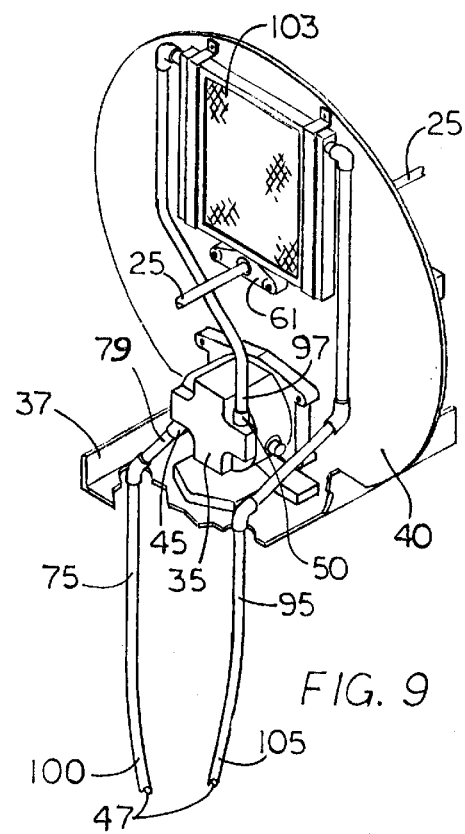
FIG. 9 is a partial sectioned perspective diagram of an agricultural air handler, according to an embodiment of this invention.
Figure 8:
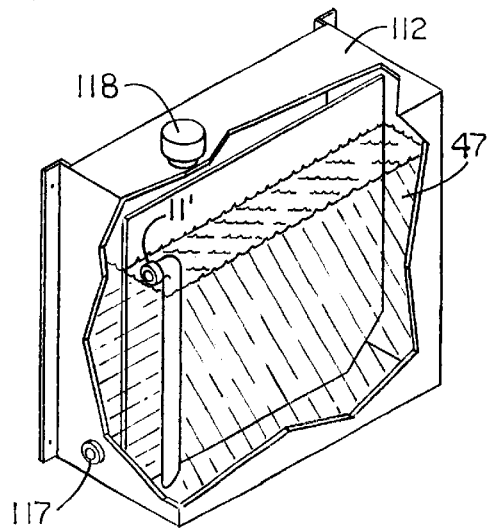
FIG. 8 is a partial sectioned perspective diagram of an agricultural air handler, according to an embodiment of this invention.
Figure 10:
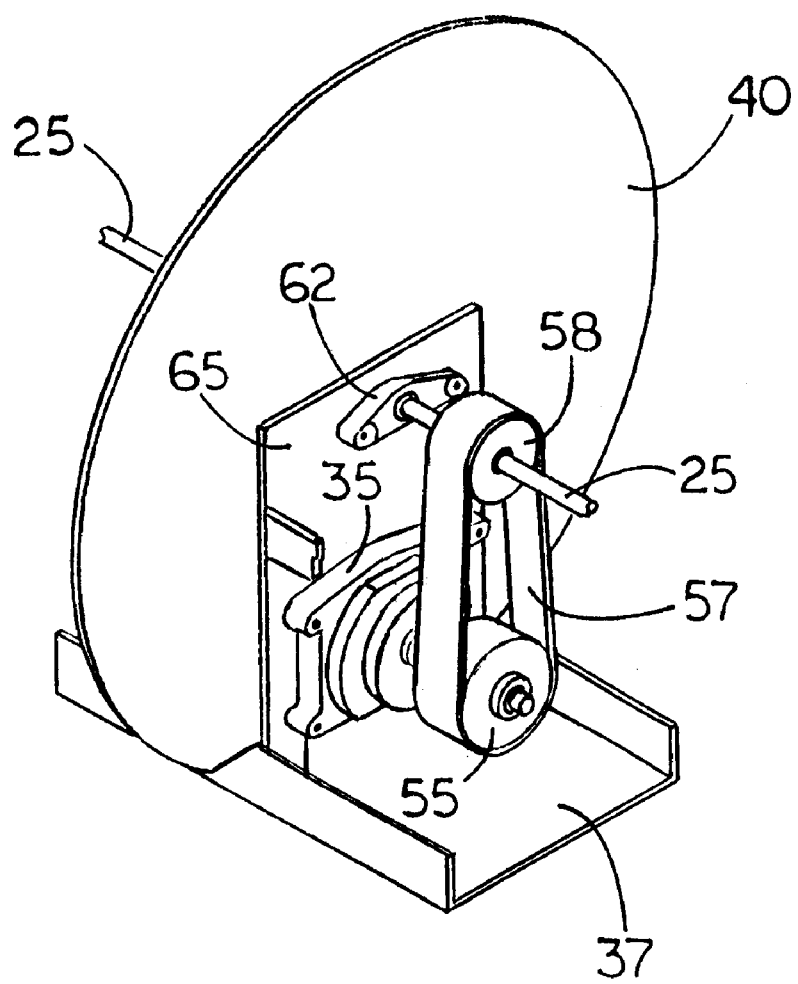
FIG. 10 is a partial perspective diagram of an agricultural air handler, according to an embodiment of this invention.

A shaft drive mechanism for rotating the shaft 25 is also housed within the shroud 10. A preferred shaft drive mechanism is shown in FIGS. 5, 6, 9 and 10. The shaft drive mechanism includes a drive motor 35 as shown in FIGS. 9 and 10, as preferably mounted in the bottom 17 of the shroud. To provide a sturdy platform for the remainder of the shroud, the bottom of the shroud preferably includes a heavier gauge metal bottom plate 37.

The drive motor 35 is a hydraulic driven impeller in the preferred alternatives shown in FIGS. 1 through 15. The drive motor is powered by a pump 39 that is mounted remotely from the shroud 10 and discussed further hereinafter. The separation of the shaft drive mechanism from the pump enables the shroud to be much smaller in size when compared to a shroud that is sized to enclose an internal combustion engine large enough to adequately power the air handler.

Figure 7:
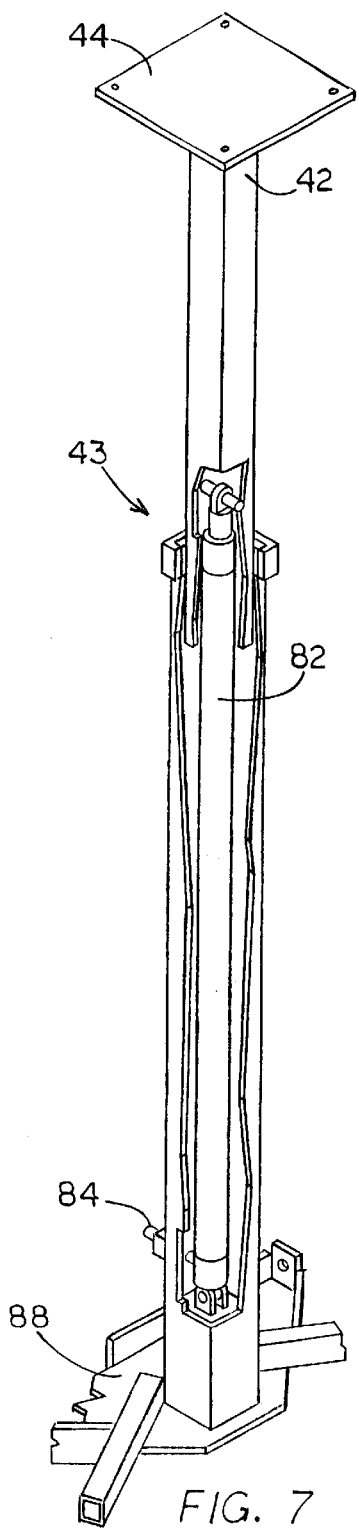
FIG. 7 is a partial sectioned perspective diagram of an agricultural air handler, according to an embodiment of this invention.

The drive motor 35 is preferably located near the center of the bottom 17 of the shroud and mounted to the bottom plate 37, as shown in FIG. 9. The drive motor is preferably placed at the base of a divider plate 40. Placing the drive motor at the center and at the bottom of the shroud greatly simplifies connecting the shroud to a mast 43 (see FIG. 7). The heavier components of the shroud are mounted to a top end 42 of the mast, directly to a mast connection plate 44. The mast connection plate is then attached to the bottom plate of the shroud to minimize vibration and additional structural support between the mast and the shroud. The mast connection plate is mounted on the top of the mast, as shown in FIG. 7. The first propeller 30 and the second propeller 31 are balanced symmetrically about the connection plate to also minimize vibration between the shroud and the mast. The inventor found that the two opposing propellers caused excessive suction. The divider plate serves to separate the air being drawn by the first propeller or the second propeller.

As shown in FIG. 9, the drive motor 35 includes an inlet 45 that receives a hydraulic fluid 47 under pressure. FIG. 9 also shows a supply line 75 and a return line 95, both containing the hydraulic fluid within. The drive motor also includes an outlet 50 where the hydraulic fluid is discharged and eventually returned to the hydraulic pump to be repressurized and routed back to the drive motor. The drive motor operates at relatively high revolutions per minute (R.P.M.), preferably in a range of 800 to 1800 and most preferably at an operational maximum R.P.M. of 1650 at 21 gallons per minute. The drive motor is of a standard commercially available size and design. The drive motor can be specified to receive hydraulic fluid in the range of 100 to 4000 psi and most preferably with a operational maximum of 2500 psi. As shown in FIG. 10, the drive motor preferably includes a drive wheel 55 which can accept a drive belt 57 for an encircling attachment around the drive wheel and a corresponding drive pulley 58, located on the shaft 25.

The drive wheel 55, drive belt 57 and the drive pulley 58 are all of standard, commercially available designs, and are selected to meet the torque transfer required to rotate the first propeller 30 and the second propeller 31 at the desired speed, preferably within the above listed ranges. Therefore, the drive motor 35 is able to rotate the shaft indirectly, through the drive belt. Compared with direct drive or gear drive configurations, the inventor found that this preferable configuration minimizes the potential of damage to the apparatus of the present invention in the event one of the propellers become somehow jammed or locked while operating. Also most preferably, an idler wheel (not shown) can can be utillized to remove slack in the drive belt. The idler wheel is preferably located between the drive wheel and the drive pulley. The idler wheel deflects the drive belt, forcing the drive belt to run in a serpentine manner, thereby increasing tension in the drive belt and removing any potential slack.

As shown in FIG. 6, a first shaft bearing 60 and a fourth shaft bearing 63 are also preferably mounted to the bottom plate 37 attached to the bottom 17 of the shroud 10. As shown in FIG. 9, a second bearing 61 is also preferably included and as shown in FIG. 10, a third shaft bearing is also preferably included. The shaft bearings accept the shaft to allow the shaft to rotate freely. The first shaft bearing is located proximate the first shaft end 27 and the first shroud end 19. Similarly, the fourth shaft bearing is located proximate the second shaft end 28 and the second shroud end 20. The second shaft bearing and the third shaft bearing are preferably located on each side of the divider plate 40. As shown in FIGS. 6 and 10, a support plate 65 is preferably included for mounting to the divider plate giving additional support to the divider plate.

Figure 2:
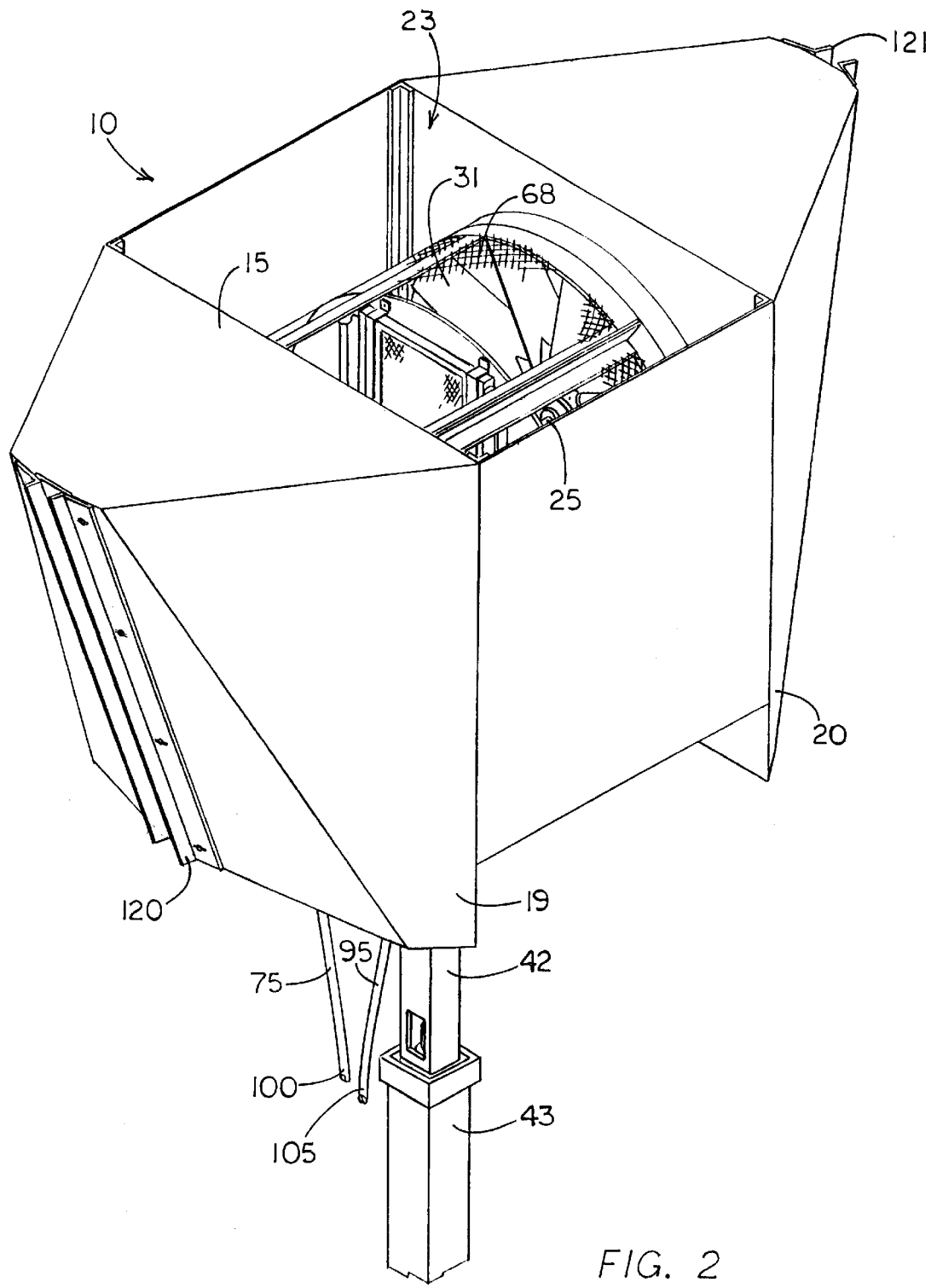
FIG. 2 is a partial perspective diagram of an agricultural air handler, according to an embodiment of this invention.

To prevent materials from being sucked into or otherwise introduced into the air inlet 23 and inadvertently impacting the inter-related structures housed within the shroud 10, including the first propeller 30, the second propeller 31, the drive belt 57 or the shaft 25, the shroud preferably includes a cage 68 that is preferably a mesh screen, as shown in FIGS. 2, 4 and 5. The cage is most preferably cylindrical in shape and sized at a slightly larger diameter than the first propeller and the second propeller. The cage, as preferably configured and shown herein, allows air to be drawn from all around the cage, except for the bottom plate 37. The mesh screen of the cage is selected to help prevent foreign objects from entering the area of the rotating propellers, while minimizing air resistance through the mesh screen.

Figure 11:
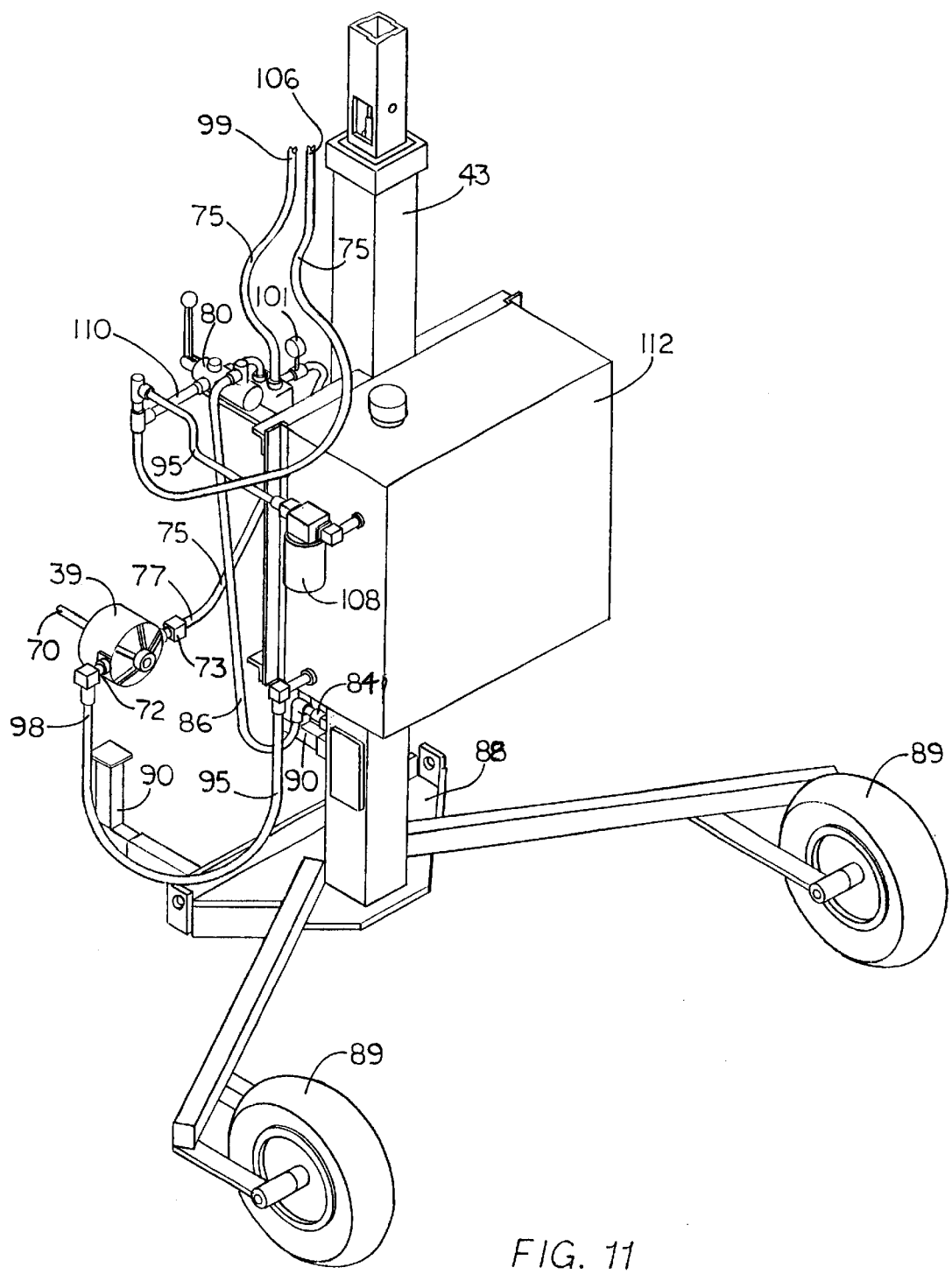
FIG. 11 is a partial perspective diagram of an agricultural air handler, according to an embodiment of this invention.

In the preferred alternative, the agricultural air handler 5 of the present invention is mountable to a tractor (not shown). The tractor is preferably of a conventional, commercially available design. Tractors in the 50 to 100 horsepower range are typically equipped at the factory with a "power take-off" shaft 70, as shown in FIG. 11 and conventionally located at the rear of the tractor. The power take-off is in most instances simply a drive shaft extension form the transmission of the tractor that rotates at approximately a 1:1 ratio with the crank (not shown) of the tractor. The pump 39 for pressurizing the hydraulic fluid 47 utilized to drive the propeller is shown in FIG. 11 as attached to the power take-off of a standard tractor.

As with the hydraulically powered drive motor 35, the pump 39 is also of a commercially available, standard design. The pump is preferably a centrifugal hydraulic pump that is specified to pressurize the circulating hydraulic fluid within the range of 100 to 4000 psi and most preferably with a operational maximum of 2500 psi and 550 R.P.M. and a nominal flow rate of 21 gallons per minute at 2000 psi. The hydraulic pump includes a suction port 72 and a discharge port 73, as shown in FIGS. 1 and 11.

A portion of a hydraulic circuit employed to supply pressurized hydraulic liquid 47 to the drive motor 35 and return it back to the pump is detailed in FIGS. 9 and 11. The hydraulic circuit is remarkable in that it preferably employs high flow at a relatively low pressure instead of higher pressure at low flow, as typically utilized in hydraulic power systems.

A supply line 75 for the hydraulic fluid 47 connects the pump 39 to the drive motor 35. At a minimum, the supply line includes a first supply end 77 (see FIG. 11) and a second supply end 79 (see FIG. 9). The first supply end connects to the discharge port 73 of the pump and the second supply end connects to the inlet port 45 of the shaft drive motor.

Preferably, as shown in FIG. 11, the supply line 75 includes a flow controller 80 for regulating the flow of the hydraulic fluid 47 and for bypassing hydraulic fluid to a mast actuator 82. The flow controller is a standard, commercially available hydraulic flow controller. The mast actuator is shown in FIGS. 7 and 11, and is housed within the mast 43. The mast actuator raises and lowers the mast and the shroud 10, which is mounted to the attachment plate 44 of the mast. The mast actuator includes a fluid port 84. When the pressurized hydraulic fluid is received into the fluid port from an actuator line 86, as routed by the flow controler, the mast actuator extends, and raises the attached shroud. When the hydraulic fluid is expelled from the actuator mast, as also directed by the flow controller, the mast actuator retracts, thereby lowering the shroud.

The mast 43 preferably rests upon a trailer 88 as shown in FIGS. 1, 7 and 11. The trailer is preferably configured to be pulled behind a tractor (not shown). The trailer also preferably includes a set of wheels 89 to support the trailer and a pair of trailer stands 90 that are shown in an upward pointing position in FIG. 11. The trailer stands can be inverted to point downward, thereby allowing the trailer to stand on four points, independent of the tractor.

The hydraulic circuit for powering the drive motor 35 also includes the return line 95. The return line returns the hydraulic fluid 47 from the drive motor to the pump 39. The return line includes a first return end 97 (see FIG. 9) and a second return end 98; the first return end connects to the outlet port 50 of the drive motor and the second return end connected to the suction port 72 of the pump.

The return line 95 and the supply line 75 are preferably of a conventional tubular design and sized to minimize flow resistance at a reasonable unit cost. A standard, tubular, heavy duty, oil and solvent resistant, reinforced rubber, high pressure hydraulic hose that is suitable for outdoor use, is most preferred.

As shown in FIG. 11, a preferable routing of the supply line 75 includes first passing the hydraulic fluid 47 from the discharge port 73 of the pump 39, through the first supply end 77, to a pressure gauge 101. The hydraulic fluid is then routed to the flow controller 80. The user can manually route the pressurized hydraulic fluid to the mast actuaor 82, bypass the remainder of the circuit and route the fluid to the return line 95, or maintain the hydraulic circuit and route the hydraulic fluid through the second supply end 79 to the inlet port 45 of the drive motor 35. The inventor considers automatic controls for activating the flow controller from remote locations, such as the driver's cab of the tractor (not shown). The supply line ends its depiction in FIG. 11 at 99 and begins again in FIG. 9 at 100.

As shown, beginning in FIG. 9, a preferable routing of the return line 95 includes first passing the hydraulic fluid 47 from the outlet port 50 of the drive motor, through the first return end 97, to a cooler 103. The cooler is a small radiator that reduces the temperature of the circulating hydraulic fluid by exahanging heat from the hydraulic fluid to the air being drawn through the shroud. From the cooler the return line ends its depiction in FIG. 9 at 105 and begins again in FIG. 11 at 106.

In FIG. 11, the hydraulic fluid 47 in the return line 95 is shown as routed to a filter 108, after teeing with a bypass line 110 from the flow controller. The filter is preferably a standard canister type hydraulic fluid filter. From the filter, the hydraulic fluid is preferably received into a inlet down spout 111 of a reservoir 112. The reservoir, shown in FIG. 8, also includes an internal baffle 115 and an outlet port 117. The hydraulic fluid in the circuit can be easily maintained by checking the hydraulic fluid level within the reservoir and replenishing the hydraulic fluid into the revervoir throuh the capped inlet 118.

From the outlet port 117 of the reservoir 112, the hydraulic fluid 47 flows to the second return end 98 of the return line 95, as shown in FIG. 11. The second return end is attached to the suction port 72 of the pump 39. The power take-off 70 of the tractor (not shown) spins the impeller of the pump and repressurizes the hydrulic fluid for another circuit pass.

Some tractors (not shown) include hydraulic systems that have the capacity to operate auxiliary hydraulic devices, like the air handler 5 of the present invention. For this alternative, the pressurized supply line 75 of the system can be attached proximate the begining point 100 and the return line 95 can be attched proximate the ending point 105, shown in FIGS. 2 and 9.

As further shown in FIG. 2, to modify the air flow from the first propeller 30 and the second propeller 31, the shroud 10 preferably includes a first diffuser 120 and a second diffuser 121, positioned proximate the respective first shroud end 19 and the second shroud end 20. The diffusers fit over shroud outlets 122 that are shown in FIG. 3. The diffusers modify the flow of air forced from the propeller fans.

For use in the drying out of a cherry orchard prior to the harvest of the cherries, the first diffuser 120 and the second diffuser 121 direct the flow in a form of a substantially vertical plane out from the shroud. The planar air flow focuses the air on the individual cherries as the shroud of the air handler 5 passes each portion of a tree. The observed effect of the focused stream of forced air is quite remarkable. The air stream, flowing at approximately the same horizontal level, or slightly downward from horizontal, directly at the stem cup of the cherry, flows into the individual stem cups and removes any water ponded therein. This drying effect is observed to be similar to the flow of air around an object such as an airfoil. This effect conforms to the well known Bernoulli theorem, which predicts the conservation of energy in fluid streams. As with an airfoil, the speed of the airstream increases as it flows over the curved upper surface of the cherry, thereby converting some of the pressure of the airstream into velocity to quickly push any ponded water up and out of the cherry's stem cup. The inventor has discovered that air directed from above or below the cherry fails to achieve this remarkable result. This drying of the cherry is achieved with a minimum of damage to the fruit, especially when compared to the substantial damage almost certainly inflicted by the beating of a helicopter rotor above the cherry tree.

Alternatively, the presetn invention can be utillized to dry other agricultural crop, such as grapes or hops. Hops are especially suseptible to mildew and benifit from the extended reach of the air stream from the air handler.

Figure 12:
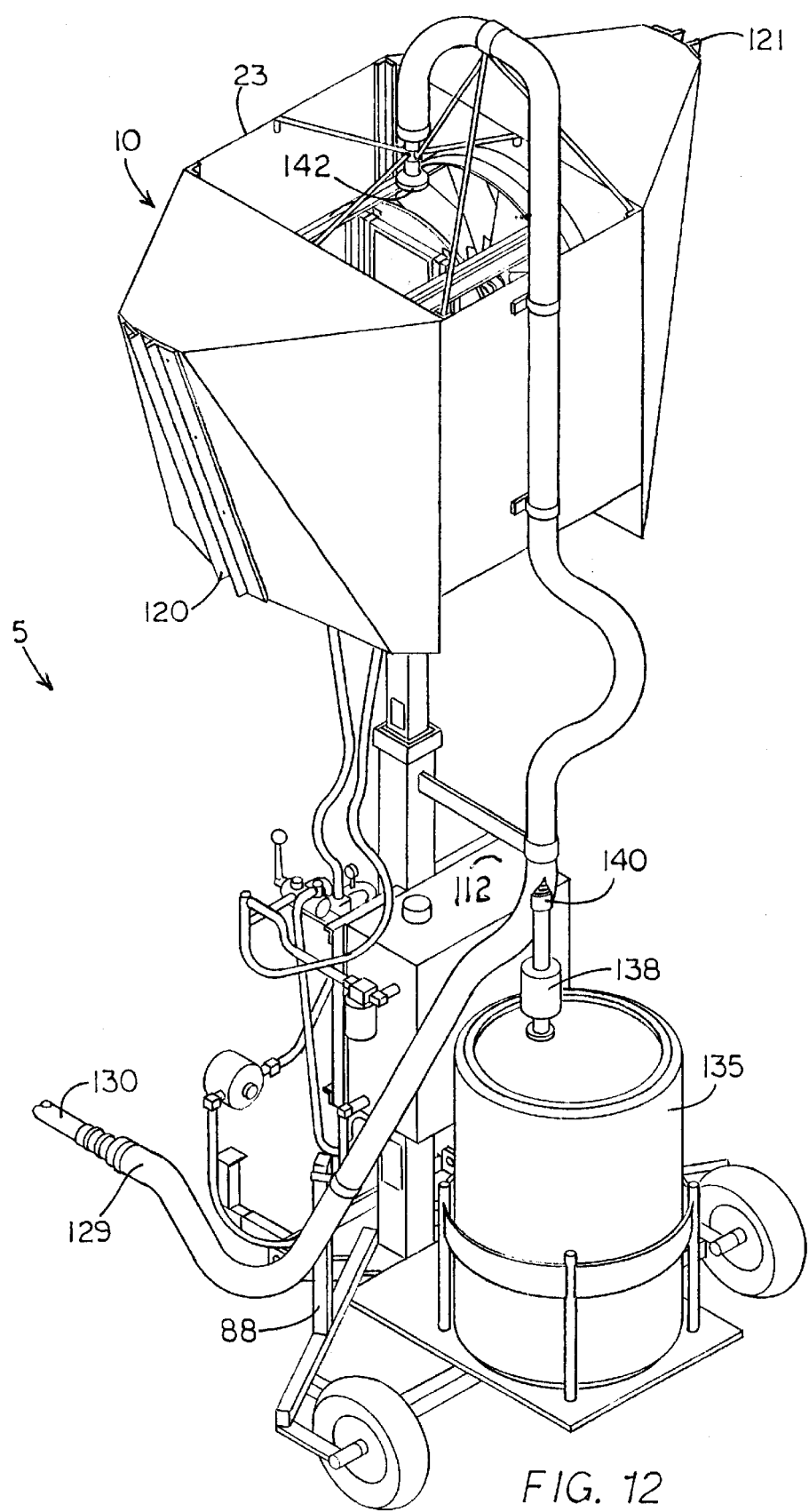
FIG. 12 is a perspective diagram of an agricultural air handler, according to another embodiment of this invention.

Also alternatively, the present invention can be modified to operate as an orchard freeze protection system, as shown in FIG. 12. Each spring, the fruit and foliage of orchards in temperate climates must often withstand freezing temperatures to survive. For freeze protection use, the configuration of the air handler is similar to the configuration shown in FIG. 1 through 11 and discussed herein above. However, an exhaust line 129 is additionally connected to the exhaust pipe 130 of the tractor (not shown). The exhaust line is preferably tubular and constructed of a flexible, heat resistant material, such as stainless steel hose. The exhaust line is routed proximate the air inlet 23 of the shroud 10 for feeding the engine exhaust from the tractor into the first propeller 30 and the second propeller 31.

The diesel exhaust of the conventional tractor provides nucleation sites for water condensation. Thermodynamicaly, when water droplets form in the air, heat is generated by the condensation. The seeding effect of the exhaust particulate is dramatic when the exhaust is piped in to the shroud. The mist covers the fruit and foliage, instantly warming them. The reduction of pressure in the inlet also serves to increase the nucleation effect of the exhaust. Also, the air drawn into the air inlet is pulled from the typically warmer air that can be found above the cooler, ground layer of air, further increasing the freeze protecting effects of the present invention.

Preferably, water or another appropriate liquid can also be introduced into the air inlet of the shroud to generate further condensation. As also shown in FIG. 12, a drum 135 can be mounted on the trailer 88. The drum can contain a liquid, preferably water. A water pump 138 supplies water to the air inlet 23 through a water line 140. Preferably the water line is contained within the exhaust line. The water line is also preferably tubular and constructed of a flexable, heat resistant material, such as stainless steel or most preferably copper hose. This serves to heat the water prior to its introduction into the inlet of the shroud, assuring proper atomization as the water exits an atomizer head 142.

As an alternative to or in addition to piping the exhaust from the tractor to the shroud 10, an internal combustion engine (not shown) can be used in place of the hydraulic circuit. A smaller two cycle engine can provide the needed particulate for water droplet formation, and provide the power to rotate the shaft 25. The inventor has found, however, that hydraulic power is greatly superior to the internal combustion power alternative, especially for cherry drying, as discussed herein above.

Figure 13:
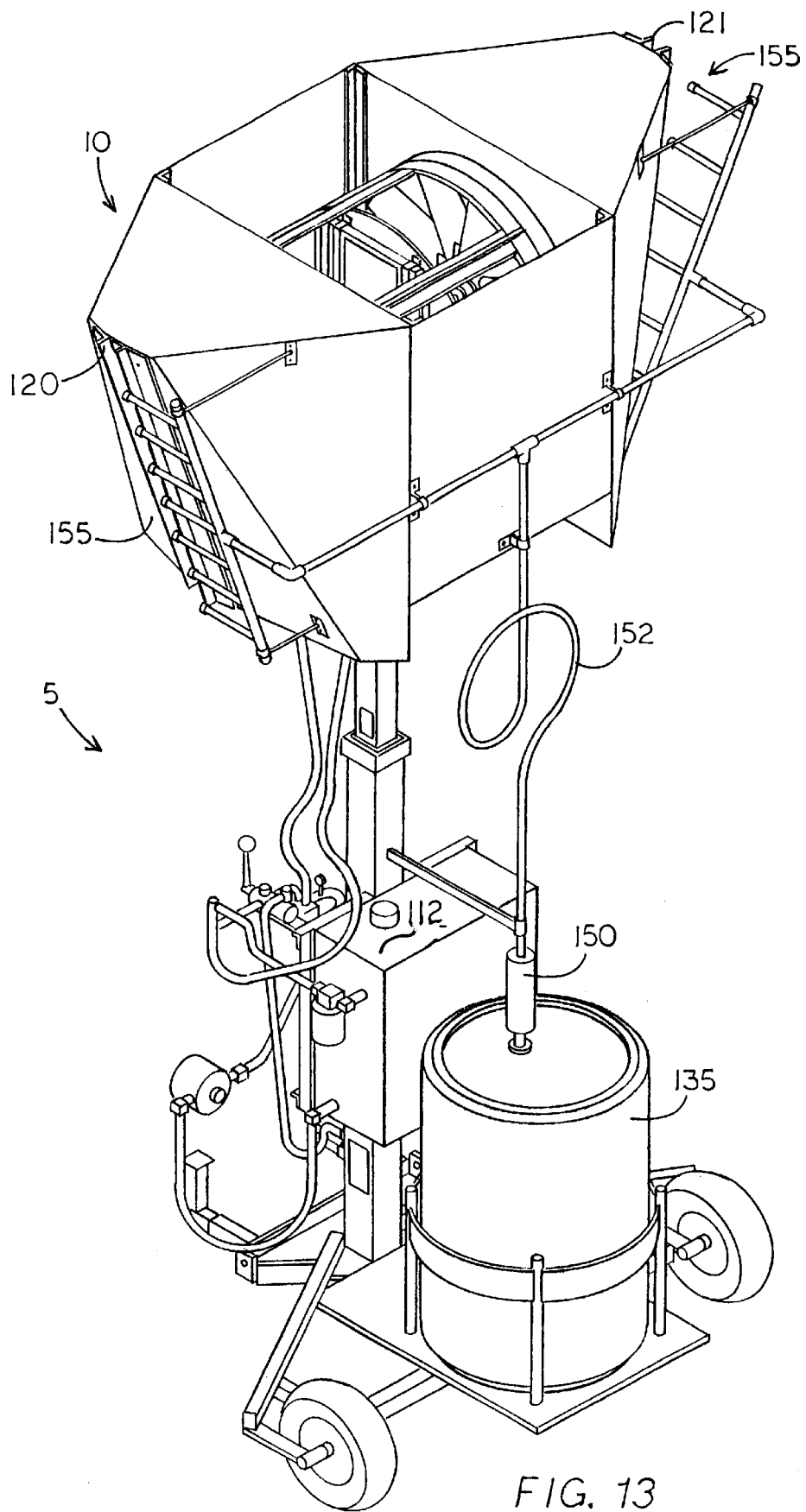
FIG. 13 is a perspective diagram of an agricultural air handler, according to another embodiment of this invention.

In another alternative embodiment of the present invention, as shown in FIG. 13, the air handler 5 can be utilized to spray liquid formulations of agricultural chemicals. The drum 135 mounted to the trailer 88 can include a delivery pump 150 and flexable tubing 152 to supply a row of atomizers 155 affixed proxiamte the first diffuser 120 and the second diffuser 121. The drum can contain a mixture of desired agricultural chemicals, including fertilizers or pesticides.

Figure 14:
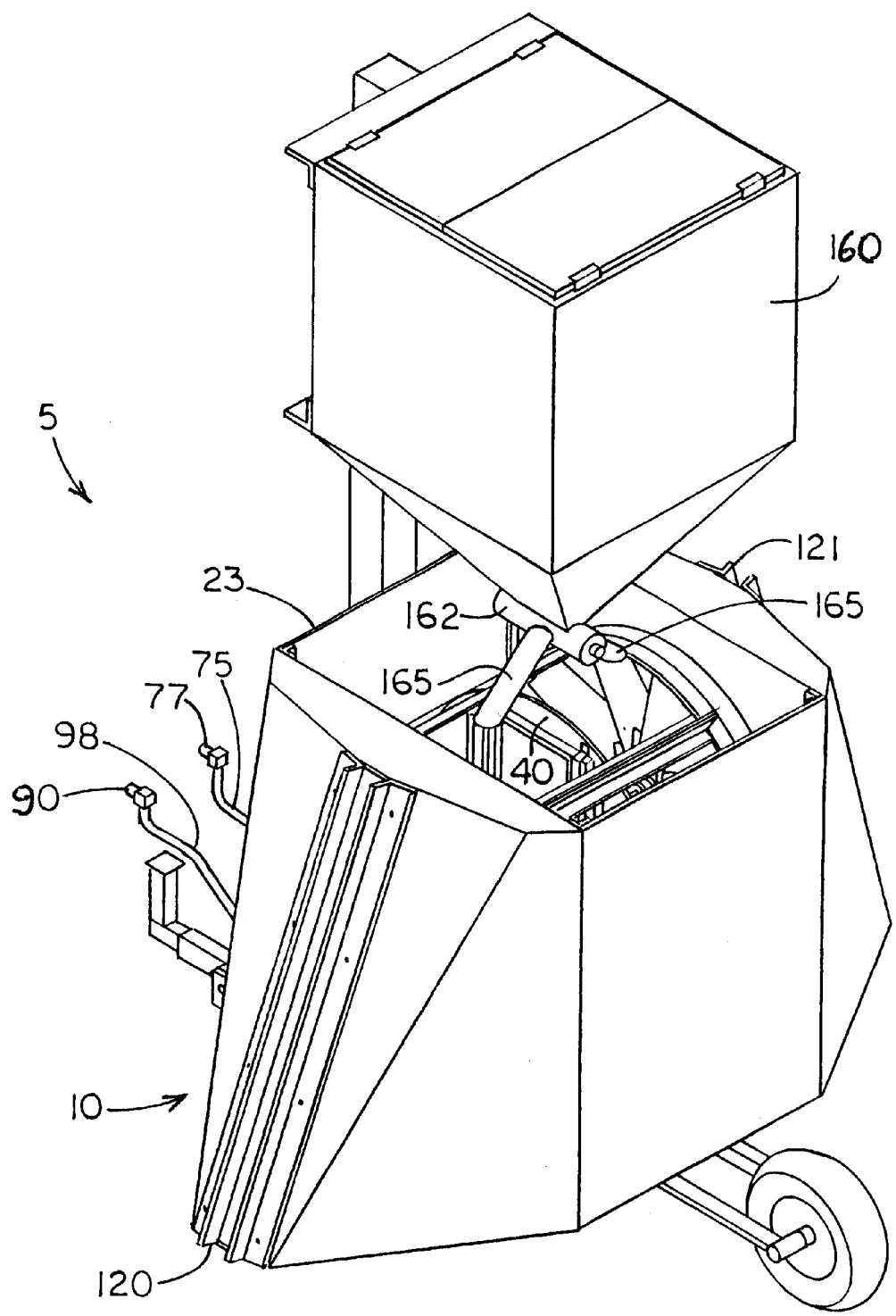
FIG. 14 is a perspective diagram of an agricultural air handler, according to another embodiment of this invention.

In yet another alternative embodiment of the present invnetion, as shown in FIG. 14, the air handler 5 can be utilized to apply agricultural dusts and powder formulations. The shroud is inverted from the configuration shown in FIGS. 1 through 13. For dust applications a hopper 160 is mounted on a single wheeled trailer, directly above the air inlet in the shroud. An auger 162 at the base of the hopper delivers the dust in a metered fashon to the air inlet where a tee 165 splits the dust around the divider plate 40. The dust is then distributed by the first propeller and the second propeller 31 through the first diffuser 120 and second diffuser 121, respectively. The hydraulic power requirements of this embodiment are typically much less than for the other embodiments disclosed herein. Therefore it is preferred to connect the first supply end 77 of the supply line 75 and the second return end 98 of the return line 95 directly to the tractor's own auxiliary hydraulic system (not shown). For use in drying grapes, the inventor considers utilizing the inverted configuration of FIG. 14 with duct extensions added to the diffusers to direct the air stram upward and horizontal toward the grape vines.

Figure 15:
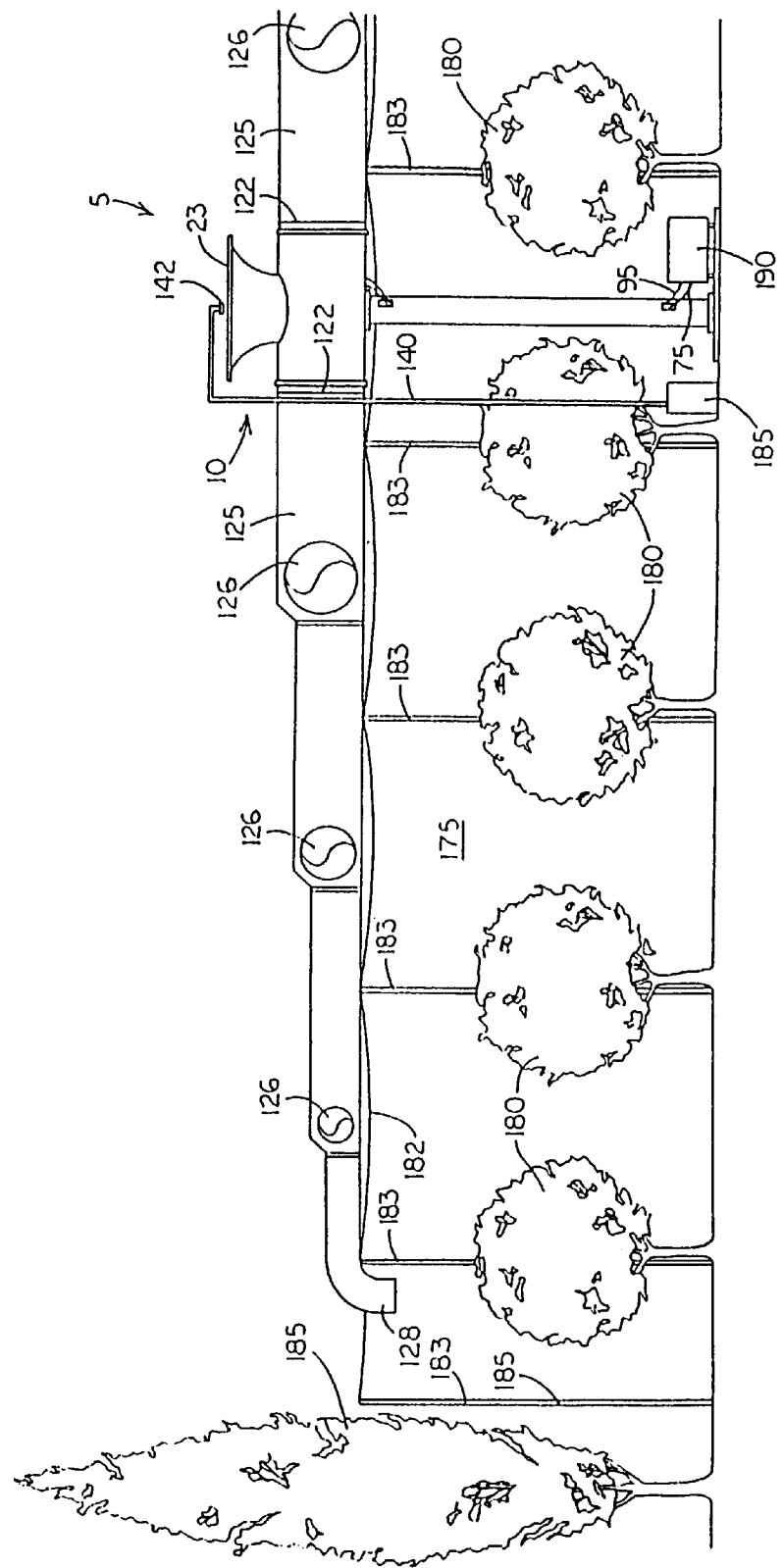
FIG. 15 is a partial sectioned perspective diagram of an agricultural air handler, according to another embodiment of this invention.

As shown in FIG. 15, in still another alternative of the present invention, the agricultural air handler 5 can serve as an atmospheric modifier for an enclosed crop growing area 175. The enclosed crop growing area can be an orchard that includes trees that bear a fruit. The orchard includes a top barrier 182 over the tops of the trees and a side barrier 185 at the perimeter of the orchard to form the enclosed area.

As also shown in FIG. 15, the top barrier 182 is a thin, flexible material, preferably fabric or plastic material in the form of a sheet. The barrier is preferrably suspended with trellis poles 183. One purpose of the barrier is to prevent or impede the passage of air through the barrier. The barrier may also be selected to have other desired properties. In warm climates, the barrier may have sun shading properties. In moist climates, the barrier may have rain shedding properties or be impermeable to rain water. The barrier can also be selected to repel pests, such as insects, birds or bats. The side barrier 185 can include a vertically hanging flexible sheet and a row of windbreak trees, such as poplar trees.

The configuration of the portable, preferably tractor mountable configuration of the air handler 5, as herein above described, is similar to the atmosphere modifying air handler configuration as shown in FIG. 15. The atmosphere modifying configuration includes a shroud having an air inlet 23 is located proximate the top of the shroud. A venturi type air inlet configurtation is preffered. This configuration can allow the drawing of air down into the enclosed space from a cooler or a warmer air strata that may be found directly above the ground level. Alternatively, the air inlet can be located on the bottom of the shroud to allow the air handler to recirculate the air within the enclosed area. Most preferably, the operator of the device can remove a panel in the top of the shroud or the bottom of the shroud, or use a damper (not shown), in order to have the ability to selectively draw air from either above the air handler or below the air handler.

Main ducts 125 are attached to the openings 122 at each end of the shroud 10. The duct supplies air to specific points from above the enclosed crop growing area. Branch ducts 126 can be routed from the main duct to serve an entire orchard area. Down drops 128 can penetrate the top barrier 182 to supply air to the enclosed crop growing space. Heaters and/or cooling coils can also be inserted after the openings in each end of the shroud to heat or cool the enclosed crop growing space.

Preferably the drive motor for the present embodiment can be powered by a hydraulic fluid 47 (not shown) circulated in the supply line 75 and return line 95 as shown in FIG. 15, from a hydraulic pump housing 190. Preferably the hudraulic pump is electric. Alternatively, other power sources could be utilized to drive the shaft 25 in this embodiment, including electric power and internal combustion engines.

Also as shown in FIG. 15, a liquid can be delivered to the air inlet 23 of the shroud 10 through a liquid line 140 from a drum 135 or some similar type of container. The liquid is pumped from the drum, through the liquid line and atomized at the atomizer 142 located proximate to the air inlet.

Also alternatively, a radiative grill (not shown) could be attached to the air inlet 23 of the shroud 10. The grill could be used to either draw off heat from the air entering the air handler 5 or supply heat to the airstream flowing therethrough. The grill would preferably be manufactured from a metallic material having a high thermal conductance. The grill could rely upon the high velocity of the air entering the inlet to convert a significant amount of the velocity energy of the air to thermal energy. The heat removed from the entering air stream could then be removed by a liquid heat transfer medium circulated within the grill.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the following claims, as apropriately interpreted in accordance with the doctrine of equivalents.

What is claimed is:

1. An agricultural air handler apparatus comprising:

a shroud having a top, a bottom, a first end having a first outlet and a second end having a second outlet, and an air inlet, said air inlet proximate the top of said shroud;

a shaft having a first shaft end and a second shaft end, a first propeller mounted proximate the first shaft end and proximate the first end of said shroud;

a second propeller mounted proximate the second shaft end and proximate the second end of said shroud;

a shaft drive means for rotating said shaft;

said shroud formed to surround said first propeller, said second propeller, said shaft drive means, and said shaft;

said agricultural air handler apparatus mountable to a tractor, and said tractor having an exhaust pipe; and a tubular exhaust line connectable to the exhaust pipe of said tractor, said exhaust line routed proximate the air inlet of said shroud for feeding an engine exhaust from the tractor into the air inlet of said shroud.

2. The agricultural air handler apparatus of claim 1 wherein a tubular liquid line is contained within said exhaust pipe, said liquid line for feeding a liquid from a liquid reservoir into the air inlet of said shroud, and the liquid within said liquid line is heated by the engine exhaust within said exhaust line.

3. In an agricultural air handler apparatus comprising a shroud formed to surround a shaft and to surround a shaft drive means for rotating said shaft, said shroud having a top, a bottom, a first end and a second end, an air inlet proximate the top of said shroud, said shaft having first shaft end and a second shaft end, aid said shaft drive means having an inlet port and an outlet port; a first propeller mounted proximate the first shaft end;

a second propeller mounted proximate the second shaft end; the improvement comprising:

a first diffuser proximate the first end, a second diffuser proximate the second end, a hydraulic pump means for pressurizing a hydraulic fluid, said hydraulic pump means located external to said shroud, said hydraulic pump means having a discharge port and a suction port;

a tubular supply line having a first supply end and a second supply end, the first supply end connected to the discharge port of said hydraulic pump means and the second supply end connected to the inlet port of said shaft drive means, said supply line supplying said hydraulic fluid under pressure to said shaft drive means from said hydraulic pump means;

a tubular return line having a first return end and a second return end, the first return end connected to the outlet port of said shaft drive means and the second return end connected to the suction port of said hydraulic pump means, said return line returning said hydraulic fluid from said shaft drive means to said hydraulic pump means;

said agricultural air handler includes a mast having a hydraulic actuator, said mast having a top end, the bottom of said shroud attached to the top end of said mast; and the hydraulic actuator extended by the receipt of said hydraulic fluid as pressurized by said hydraulic pump means.

* * * * *